No. 740,079. PATENTED SEPT. 29, 1903.
H. BAUMANN.
STONE CUTTER'S GAGE.
APPLICATION FILED JULY 9, 1903.
NO MODEL.

Witnesses:
Arthur Zumpe.
Edward Ray.

Inventor:
Henry Baumann
by his attorney
Hanko Briesen.

No. 740,079. Patented September 29, 1903.

UNITED STATES PATENT OFFICE.

HENRY BAUMANN, OF HOBOKEN, NEW JERSEY.

STONE-CUTTER'S GAGE.

SPECIFICATION forming part of Letters Patent No. 740,079, dated September 29, 1903.

Application filed July 9, 1903. Serial No. 164,766. (No model.)

*To all whom it may concern:*

Be it known that I, HENRY BAUMANN, a citizen of Germany, residing at Hoboken, Hudson county, State of New Jersey, have invented certain new and useful Improvements in Stone-Cutters' Gages, of which the following is a specification.

This invention relates to a stone-cutter's gage by means of which a pattern in relief may be readily reproduced upon a stone on a different scale.

Figure 1:
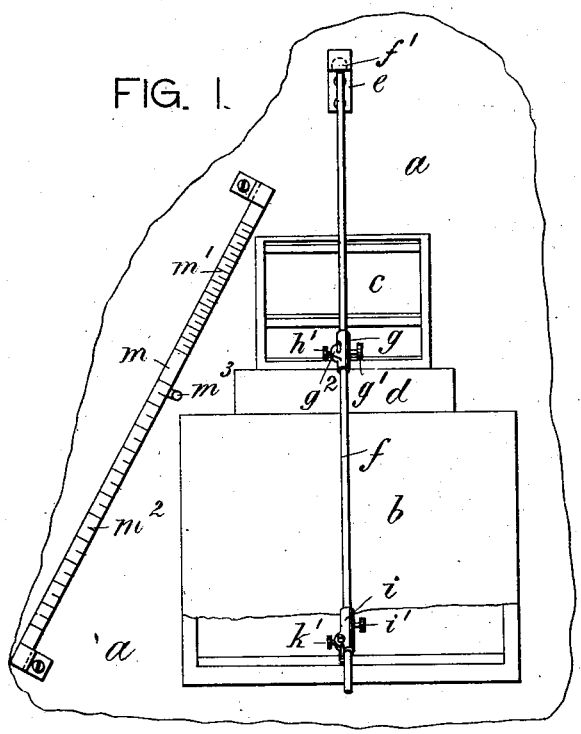
Figure 2:
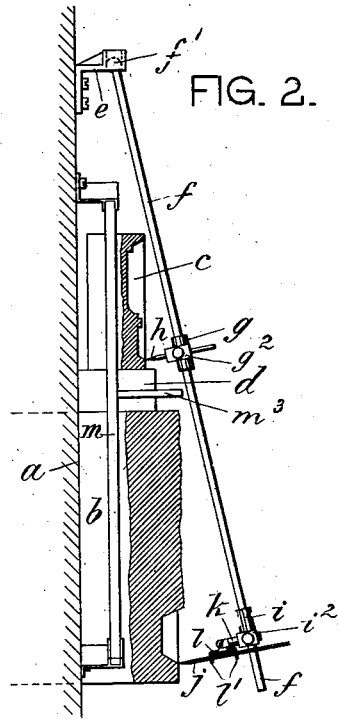
Figure 3:
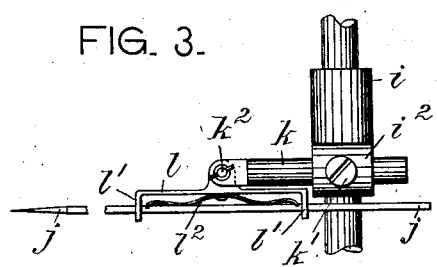
Figure 4:
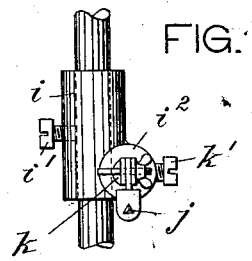
Figure 5:
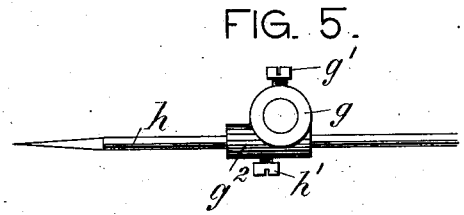

In the accompanying drawings, Figure 1 is a front elevation of my improved stone-cutter's gage; Fig. 2, a side elevation thereof, partly in section; Fig. 3, a detail side view of the pointer; Fig. 4, an end view thereof, and Fig. 5 a detail plan of the tracer.

The letter $a$ represents a wall or other upright support, and $b$ is an outwardly-projecting stone embedded therein. The surface of this stone is to be cut to conform to the surface of a smaller model or pattern $c$, which is supported above the stone preferably upon an intervening foundation $d$. To the wall $a$ is secured, centrally above stone $b$ and model $c$, a bracket $e$, from which a lever $f$ is suspended by a universal joint $f'$. This lever carries a slidable upper tubular bearing $g$ for the tracer $h$ and a slidable lower tubular bearing $i$ for the pointer $j$. The upper bearing $g$ may be clamped to lever $f$ by a set-screw $g'$. It is provided with a sleeve $g^2$, extending at right angles and adapted to receive the tracer $h$, which may be clamped thereto by a set-screw $h'$. The lower bearing $i$ may be clamped to lever $f$ by a set-screw $i'$. It is provided with a sleeve $i^2$, extending at right angles therefrom and adapted to receive an axially-rotatable pin $k$, which may be clamped in position by a set-screw $k'$. To the end of pin $k$ is pivoted at $k^2$ a U-shaped frame $l$, the perforated shanks $l'$ of which receives the longitudinally-adjustable pointer $j$. A spring $l^2$, secured to frame $l$ and bearing against pointer $j$, holds the latter in position. By means of the construction described the distance between the end of the pointer and the lever $f$ may be varied.

To the wall $a$ there is attached a rule $m$, the working edge of which when prolonged passes through the center of joint $f'$. The rule $m$ carries an upper scale $m'$ opposite model $c$ and tracer $g$, and a lower scale $m^2$ opposite stone $b$ and pointer $j$. The scales $m'$ $m^2$ are so proportioned as to conform to the ratio of the designs on model and stone, so that if the model is to be three times enlarged the ratio of the scales is as one to three. From the rule $m$ projects an arm $m^3$, which constitutes a rest for lever $f$ when the latter is swung aside.

The operation is as follows: The tracer $g$ is placed opposite the point of the model to be copied and then the lever $f$ is swung aside, so that the position of the tracer is ascertained on scale $m'$, the surface of the rule being touched by the point of the tracer. The pointer $j$ is then set to a corresponding mark on scale $m^2$ and is simultaneously drawn in or out until its point also contacts with the rule. The lever is now swung back so that the tracer arrives on the model opposite the point to be copied, while the pointer will bear against the corresponding point of the rough stone. This point is now cut away until the tracer contacts with the model, when the elevation on the stone at this point will be in the required ratio to that on the model. After the operation is repeated for each point of the two concentric arcs along which the tools are swept the latter are set to a new radius in the manner described, so that the entire surface of the stone is gaged by successive points of successive arches, the operation being continued until the entire surface of the stone has been traversed.

Of course the invention may be applied for gaging horizontal or inclined as well as vertical surfaces.

What I claim is—

1. A stone-cutter's gage provided with a lever, an upper bearing and a lower bearing adjustably mounted thereon, a tracer secured to the upper bearing, a pointer, means for adjustably securing the pointer to the lower bearing, and a rule having two scales opposite the tracer and pointer respectively, substantially as specified.

2. A stone-cutter's gage provided with a lever, a tracer and a pointer adjustably secured thereto, a rule having two scales opposite the tracer and pointer respectively, and a lever-rest on the rule, substantially as specified.

Signed by me at New York city, (Manhattan,) New York, this 8th day of July, 1903.

HENRY BAUMANN.

Witnesses:
FRANK V. BRIESEN,
WILLIAM SCHULZ.